US006968086B1

(12) United States Patent
Fukuhara et al.

(10) Patent No.: US 6,968,086 B1
(45) Date of Patent: Nov. 22, 2005

(54) WAVELET INVERSE TRANSFORM METHOD AND APPARATUS AND WAVELET DECODING METHOD AND APPARATUS

(75) Inventors: Takahiro Fukuhara, Kanagawa (JP); Seiji Kimura, Chiba (JP); Hitoshi Kiya, 5-9-3-307, Minami-Ohsawa, Hachioji-Shi, Tokyo (JP)

(73) Assignees: Sony Corporation, Tokyo (JP); Hitoshi Kiya, Tokyo (JP)

( * ) Notice: Subject to any disclaimer, the term of this patent is extended or adjusted under 35 U.S.C. 154(b) by 0 days.

(21) Appl. No.: 09/579,803

(22) Filed: May 26, 2000

(30) Foreign Application Priority Data

May 27, 1999 (JP) .................................. 11-148452

(51) Int. Cl.[7] .............................................. G06K 9/36
(52) U.S. Cl. .................................. 382/233; 382/240
(58) Field of Search ...................... 375/240.11, 240.24, 375/240.1–241; 348/398.1, 403.1, 420.1; 341/50; 382/232–248

(56) References Cited

U.S. PATENT DOCUMENTS

| 5,901,249 | A | * | 5/1999 | Ito .............................. 382/239 |
| 5,933,535 | A | * | 8/1999 | Lee et al. ..................... 382/243 |
| 6,021,224 | A | * | 2/2000 | Castelli et al. ............... 382/232 |
| 6,229,926 | B1 | * | 5/2001 | Chui et al. .................... 382/240 |
| 6,233,357 | B1 | * | 5/2001 | Li et al. ....................... 382/248 |
| 6,473,528 | B2 | * | 10/2002 | Li et al. ....................... 382/233 |
| 6,501,861 | B1 | * | 12/2002 | Cho et al. ..................... 382/243 |
| 6,587,588 | B1 | * | 7/2003 | Bottou et al. ................. 382/240 |

* cited by examiner

Primary Examiner—Jingge Wu
(74) Attorney, Agent, or Firm—Frommer Lawrence & Haug LLP; William S. Frommer; Thomas F. Presson (57) ABSTRACT

A wavelet inverse transform method includes a decoding object coefficient extracting step of extracting only coefficients necessary for decoding a specified area from wavelet transform coefficients, and a wavelet inverse transform step of inverse transforming coefficients extracted from the decoding object coefficient extracting step. The decoding object coefficient extracting step extracts transform coefficients not only inside the specified area but also those outside the specified area. This enables only an optional partial picture to be decoded without decoding the entire picture. A corresponding wavelet inverse transform device is also disclosed.

20 Claims, 12 Drawing Sheets

WAVELET INVERSE TRANSFORM METHOD AND APPARATUS AND WAVELET DECODING METHOD AND APPARATUS

BACKGROUND OF THE INVENTION

1. Field of the Invention

This invention relates to a wavelet inverse transform method and apparatus used in extracting and decoding only transform coefficients of a specified partial area from wavelet transform coefficients obtained on encoding by wavelet transform. This invention also relates to a corresponding wavelet decoding method and apparatus.

2. Description of Related Art

Among conventional typical picture compression systems, there is a JPEG (Joint Photographic Experts Group) system, standardized by the ISO (International Organization for Standardization). This system, employing an orthogonal transform, specifically the discrete cosine transform (DCT), is known to furnish a good encoded or decoded picture when a higher number of allocated bits is used. However, if the number of encoding bits is decreased to more than a certain extent, block distortion proper to DCT becomes outstanding so that subjective deterioration is apparent. On the other hand, such a system in which an entire picture is split into plural bands by a filter, termed a filter bank, comprising the combination of a high-pass filter and a low-pass filter, and encoding is performed from one band to another, is now being researched briskly. In particular, the wavelet encoding free from the defect of block distortion, which becomes outstanding in high compression such as is presented in DCT, is thought to be promising as a technique which should take the place of the DCT.

Nowadays, an electronic still camera or a video movie exploits the JPEG or MPEG, with the transform system being the DCT. Since a product based on the wavelet transform is predicted to be presented to the market in time to come, investigations in improving the efficiency in the encoding system are proceeding briskly in many research institutes. As a matter of fact, JPEG 2000, now being worked by ISO/IEC/JTC1_SC29/WG1, which is the same organization as the JPEG, as a format the recommendation for the standardization of which is scheduled to be issued in December 2000, is felt to be promising as the next-generation international standardization system for still pictures. With this JPEG 2000, it has almost been established to use the wavelet transform in place of the pre-existing DCT of JPEG as a basic transformation system for picture compression.

The present invention is directed to the elimination of the problem in expanding only a partial area in wavelet inverse transform. That is, the entire wavelet transform coefficients are not read out and decoded, as is done in the conventional technique. This represents a significant merit in reducing the memory capacity size. In the wavelet encoding, wavelet transform needs to be applied to the entire picture to store and hold the generated wavelet transform coefficients transiently in a memory. In wavelet decoding, the operation which is the reverse of the wavelet encoding operation is performed, thus necessitating an extremely large memory capacity for storing and holding the coefficients for the entire picture. Should the picture size be increased, the memory capacity needs to be correspondingly increased. Thus, the conventional practice is not desirable for a device having a limited memory capacity, such as an electronic still camera, camcorder or PDA.

Recently, in e.g., the international standardization activities of JPEG 2000, such a technique is investigated in which the entire picture of an object of encoding is split into plural blocks to perform the encoding on the block basis. If the encoding by the encoder is done on the block bases from the outset, partial decoding can be achieved by reading out an encoded bitstream associated with a pre-set block. However, there lacks up to now a research into partial decoding in the absence of constraint on the encoder.

SUMMARY OF THE INVENTION

It is therefore an object of the present invention to provide a wavelet inverse transform method and apparatus and a wavelet decoding method and apparatus in which an encoded bitstream generated on wavelet transforming a usual entire picture is inputted to decode only an optional partial picture without decoding the entire picture.

In one aspect, the present invention provides wavelet inverse transform device including decoding object coefficient extracting means for extracting only coefficients necessary for decoding a specified area from wavelet transform coefficients, and wavelet inverse transform means for inverse transforming coefficients extracted from the decoding object coefficient extracting means, wherein the decoding object coefficient extracting means extracts transform coefficients not only inside the specified area but also those outside the specified area.

In another aspect, the present invention provides a wavelet inverse transform method including a decoding object coefficient extracting step of extracting only coefficients necessary for decoding a specified area from wavelet transform coefficients, and a wavelet inverse transform step of inverse transforming coefficients extracted from the decoding object coefficient extracting means, wherein the decoding object coefficient extracting step extracts transform coefficients not only inside the specified area but also those outside the specified area.

In another aspect, the present invention provides a decoding device including entropy decoding means for entropy decoding an encoded bitstream, generated on wavelet inverse transforming a picture, decoding object coefficient extracting means for extracting, from among wavelet transform coefficients obtained by the entropy decoding means, those necessary for decoding a specified area and wavelet inverse transforming means for inverse transforming the coefficients extracted by the decoding object coefficient extracting means, wherein the decoding object coefficient extracting means extracts transform coefficients not only in the specified area but also those on an outer rim of the specified area.

In another aspect, the present invention provides a wavelet decoding method including an entropy decoding step of entropy decoding an encoded bitstream, generated on wavelet inverse transforming a picture, a decoding object coefficient extracting step of extracting, from among wavelet transform coefficients obtained by the entropy decoding step, those necessary for decoding a specified area and a wavelet inverse transforming step of inverse transforming the coefficients extracted by the decoding object coefficient extracting step, wherein the decoding object coefficient extracting step extracts transform coefficients not only in the specified area but also those on an outer rim of the specified area.

In the decoding object coefficient extracting means or step, wavelet transform coefficients required for decoding are extracted based on the information concerning an area determined by the decoding object area determining means or step determining the area of the decoding object. The transform coefficients, thus extracted, are inverse-transformed by the wavelet inverse transform means or step. Of the transform coefficients generated in the wavelet inverse transform means or step, those in a valid range are extracted based on overlap holding processing.

The decoding object area determining means or step determines a decoding object area by an external input or determining means or step to send a position coordinate of apices in case of a rectangular area and the information on a center position as well as the radius in case of a circular area. The decoding object coefficient extracting means or step extracts coefficients necessary for decoding the area in question to send the extracted coefficients to the wavelet inverse transform means or step. The decoding object coefficient extraction means or step extracts coefficients necessary for decoding the area to send the extracted coefficients to the wavelet inverse transform means or step. The wavelet inverse transform means or step performs convolution by filter coefficients having pre-set tap lengths and wavelet transform coefficients to generate a decoded picture of the specified area.

According to the present invention, an encoded bitstream, generated on wavelet inverse transforming a usual entire picture, is inputted, to decode only an optional partial picture, without decoding the entire picture.

DESCRIPTION OF THE PREFERRED EMBODIMENTS

Referring to FIGS. 1 to 10, a wavelet inverse transform device 10, as a specified example of a wavelet inverse transform apparatus of the present invention, adapted for performing the processing corresponding to a wavelet inverse transform of the present invention, is explained in detail. Meanwhile, the wavelet inverse transform device 10 constitutes a main portion of a wavelet decoding device 60 which will be explained subsequently with reference to FIG. 11.

Among specified examples of application, there are an electronic camera, a portable telephone, a mobile picture transmission/reception terminal (PDA), a printer, an expander for a satellite image or an image for medical use, a software module thereof, an expander for a picture used in a game or a three-dimensional CG, and a software module thereof.

Figure 1:
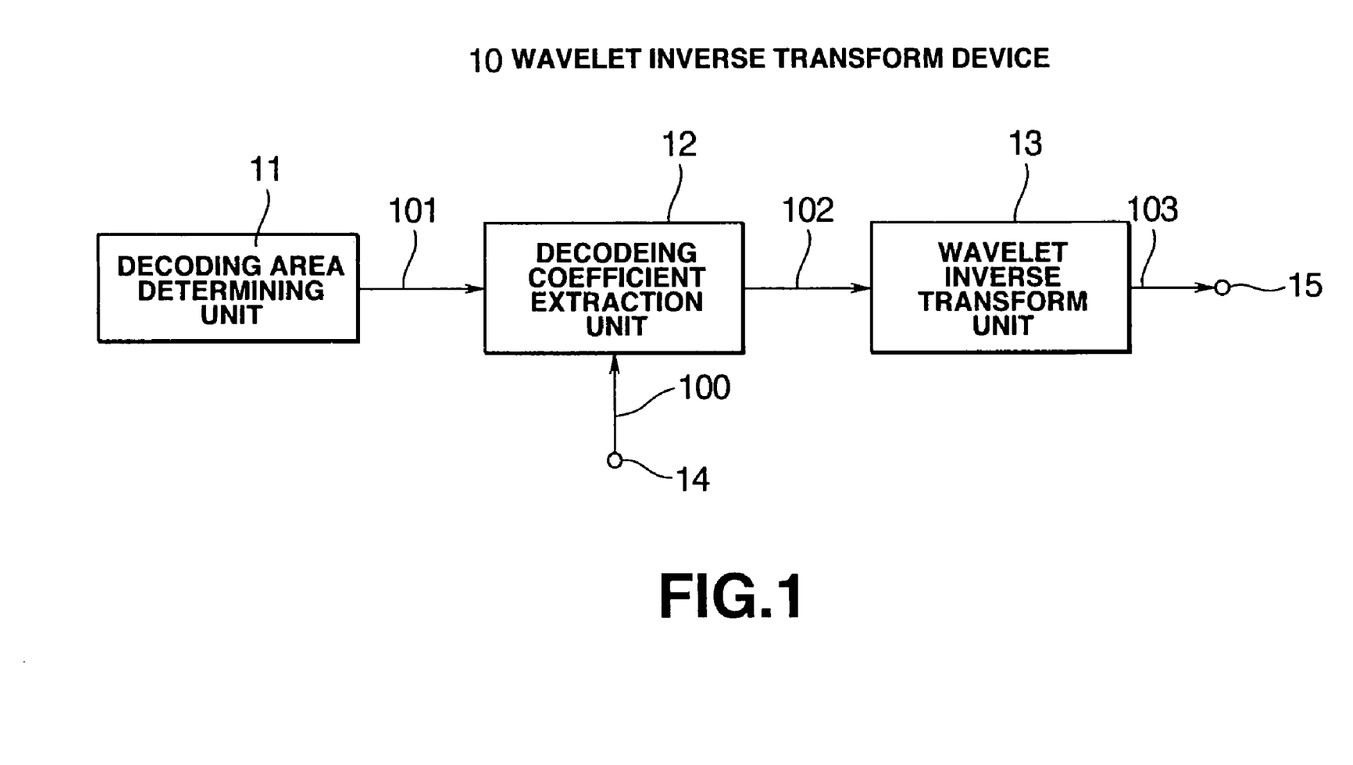
FIG. 1 shows a specified example of a wavelet inverse transform device according to the present invention and is a block diagram showing the structure of a wavelet inverse transform device adapted for performing the processing corresponding to the wavelet inverse transform method according to the present invention.

Referring to FIG. 1, this wavelet inverse transform device 10 includes a decoding objet area decision unit 11, a decoding object coefficient extraction unit 12 and a wavelet inverse transform unit 13.

The decoding objet area decision unit 11 determines a decoding object area 11 by an external input or decision means provided in the decision unit 11, to send out apex position coordinates if the decoding object area is a rectangular area, or to send out the center position and the radius information if the decoding object area is a circular area.

The decoding object coefficient extraction unit 12 extracts coefficients required in decoding an area determined by the decoding objet area decision unit 11, from wavelet conversion coefficients 100 inputted from a coefficient input terminal 14, to send the extracted coefficients to the wavelet inverse transform unit 13. In particular, this decoding object coefficient extraction unit 12 extracts transform coefficients not only in a specified area but also transform coefficients lying on an outer rim of the specified area.

The wavelet inverse transform unit 13 inverse-transforms the coefficients extracted by the decoding object coefficient extraction unit 12.

Figure 2:
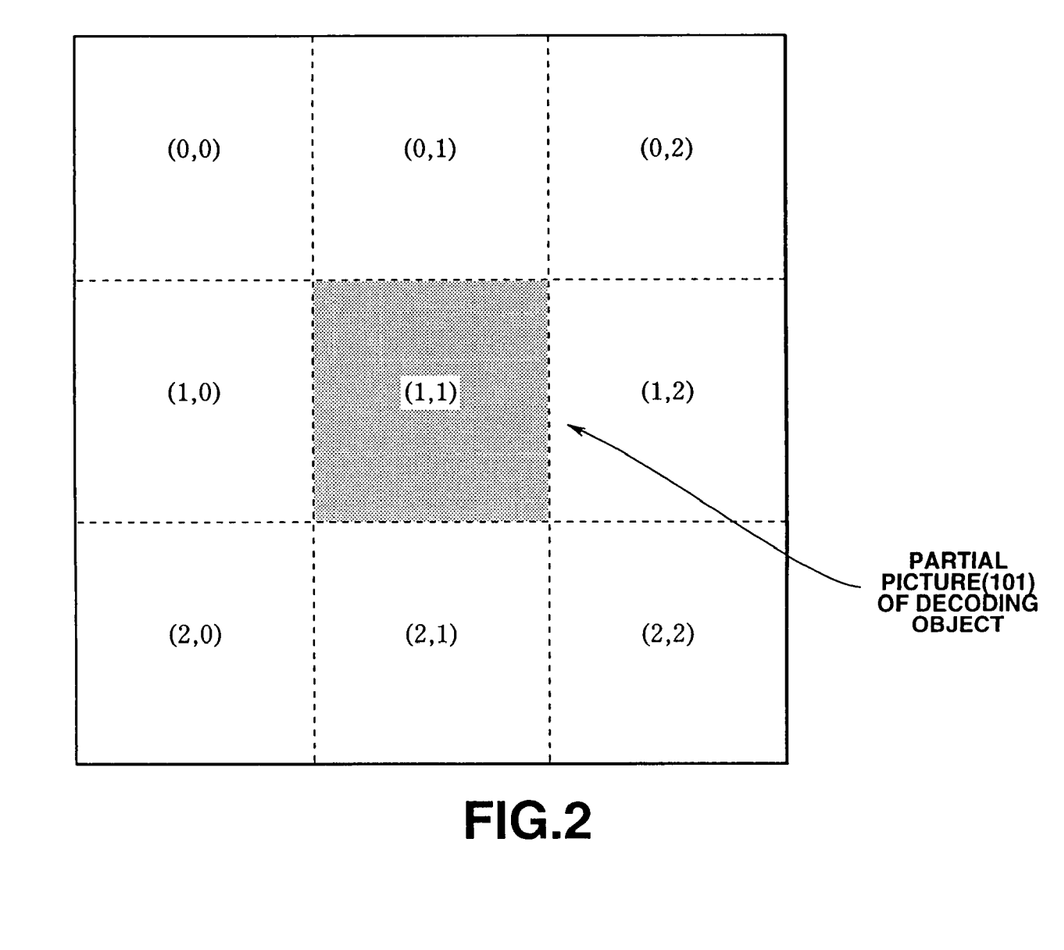
FIG. 2 shows a decoding object area.

The operation of the above-described wavelet inverse transform device 10 is hereinafter explained. First, the decoding objet area decision unit 11 determines an area in a picture to be decoded. For example, it is assumed that a partial areal picture at a center area (1, 1), from nine areas obtained on vertical 3 by horizontal 3 division, as shown in FIG. 2, is to be decoded. For denoting the decoding object area, a number depicting the number of division in the vertical and horizontal directions and the number of a block area as counted from a given terminal side may be used. Alternatively, the upper left apex coordinate and the lower right apex coordinate of a shaded area may be used.

The decoding object area information 101, represented using any of the above methods by the decoding objet area decision unit 11, is entered to the decoding object coefficient extraction unit 12 where wavelet inverse transform coefficients 102 required for decoding are extracted. Such extraction of the wavelet transform coefficients will be discussed subsequently in detail.

Here, the schematics of the wavelet transform and wavelet inverse transform, as basic techniques to which the present invention pertains, are explained.

Figure 3:
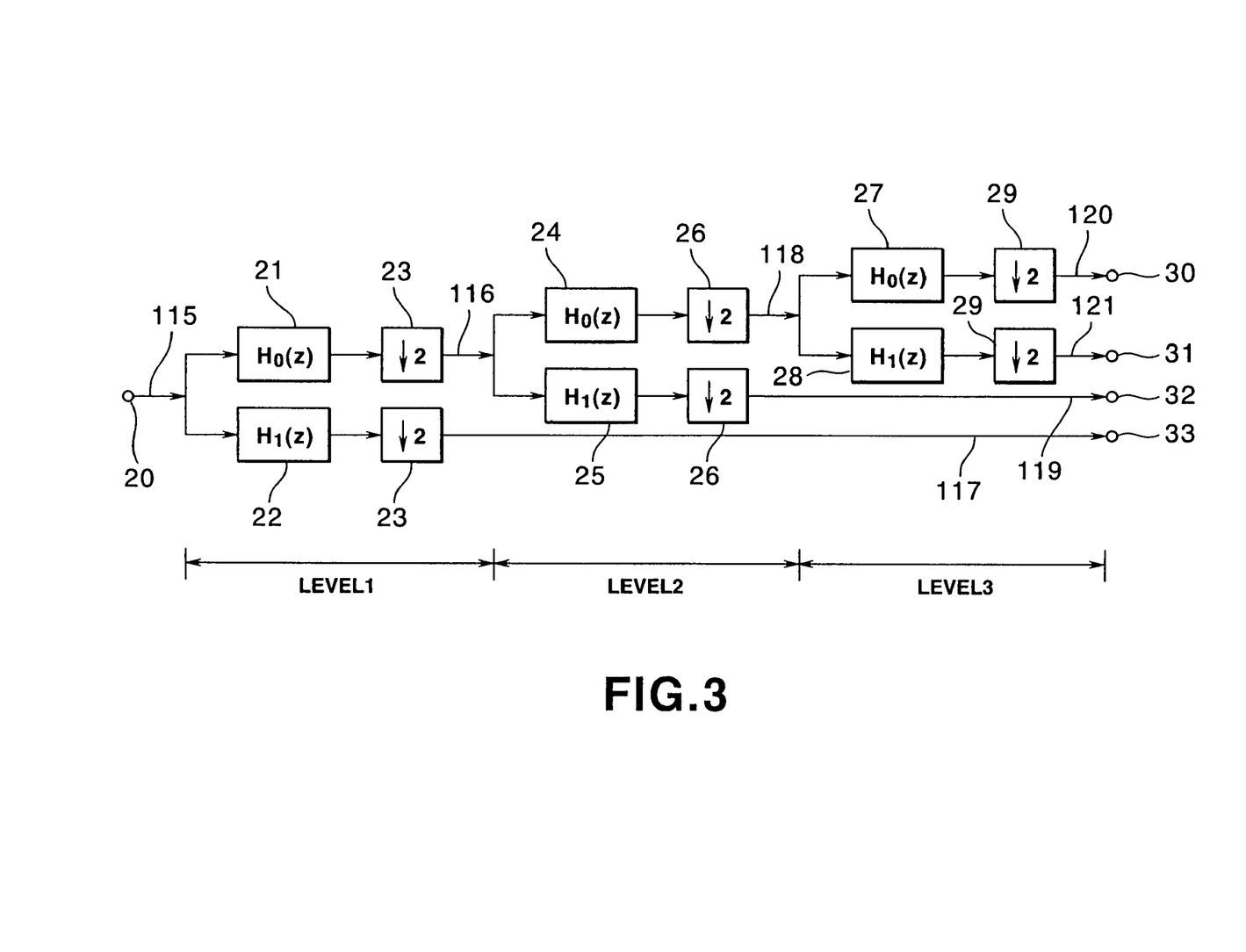
FIG. 3 is a block diagram showing the structure of an ordinary wavelet transform unit.

FIG. 3 shows an ordinary structure of a wavelet transform unit. This unit performs octave splitting, as the most popular one of plural wavelet transform technique, over plural levels. In the case of FIG. 3, the number of levels is three. Specifically, picture signals are split into a low range and a high range, with only the low range components being split hierarchically. Although FIG. 3 shows wavelet transform for a one-dimensional system, such as, for example, horizontal components of a picture, for the sake of convenience, it may be extended to a two-dimensional system in order to cope with the two-dimensional signals.

First, a picture photographed by a camera, not shown, is digitized to retrieve input picture signals 115 from an input terminal 20. These input picture signals 115 are band-split by a low-pass filter 21 and a high-pass filter 22 to produce low range components and high range components which then are decimated by downsamplers 23, 23 in resolution to one-half. The operation up to this point is the level 1 which issues two outputs, namely an L (meaning low) output 116 and an H (meaning high) output 117. Only the low range component, obtained on decimation, are again band-split by a low-pass filter 24 and a high-pass filter 25 and decimated in resolution by downsamplers 26, 26 to one-half. The operation up to this point is the level 2 which issues two outputs, namely an LL output 118 and an LH output 118. Only the low range component, that is the LL component 118, is again band-split by a low-pass filter 27 and a high-pass filter 28 and decimated in resolution to one-half by downsamplers 29, 29. The operation up to this point is the level 3. By performing the above-described processing up to a pre-set level, the band components, obtained on hierarchically band-splitting the low range component, are generated sequentially. The band components, generated at the level 3, are an LLL component 120 and an LLH component 121. The LLL component 120, LLH component 121, LH component 119 and the H component 117 are outputted to outside at output terminals 30, 31, 32 and 33, respectively.

Figure 4:
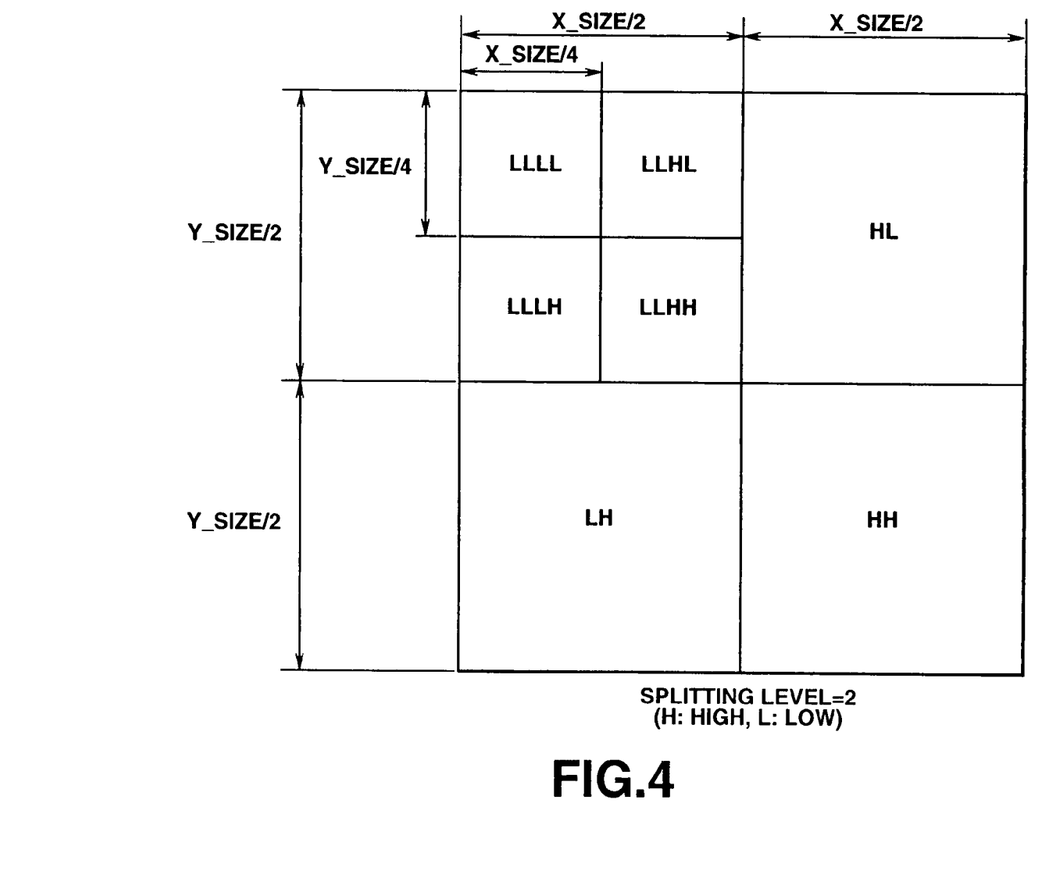
FIG. 4 shows band splitting of a two-dimensional picture.

FIG. 4 shows band components obtained on band splitting a two-dimensional picture up to the level 2. It is noted that the notation of L and H in FIG. 4 differs from that of FIG. 3 dealing with the one-dimensional signal. That is, in FIG. 4, four components LL, LH, HL and HH are produced by level 1 band splitting in both the horizontal and vertical directions, where LL means that both the horizontal and vertical components are L and LH means that the horizontal component is H and the vertical component is L. The LL component is again band-split to generate LLLL, LLHL, LLLH and LLHH.

Figure 5:
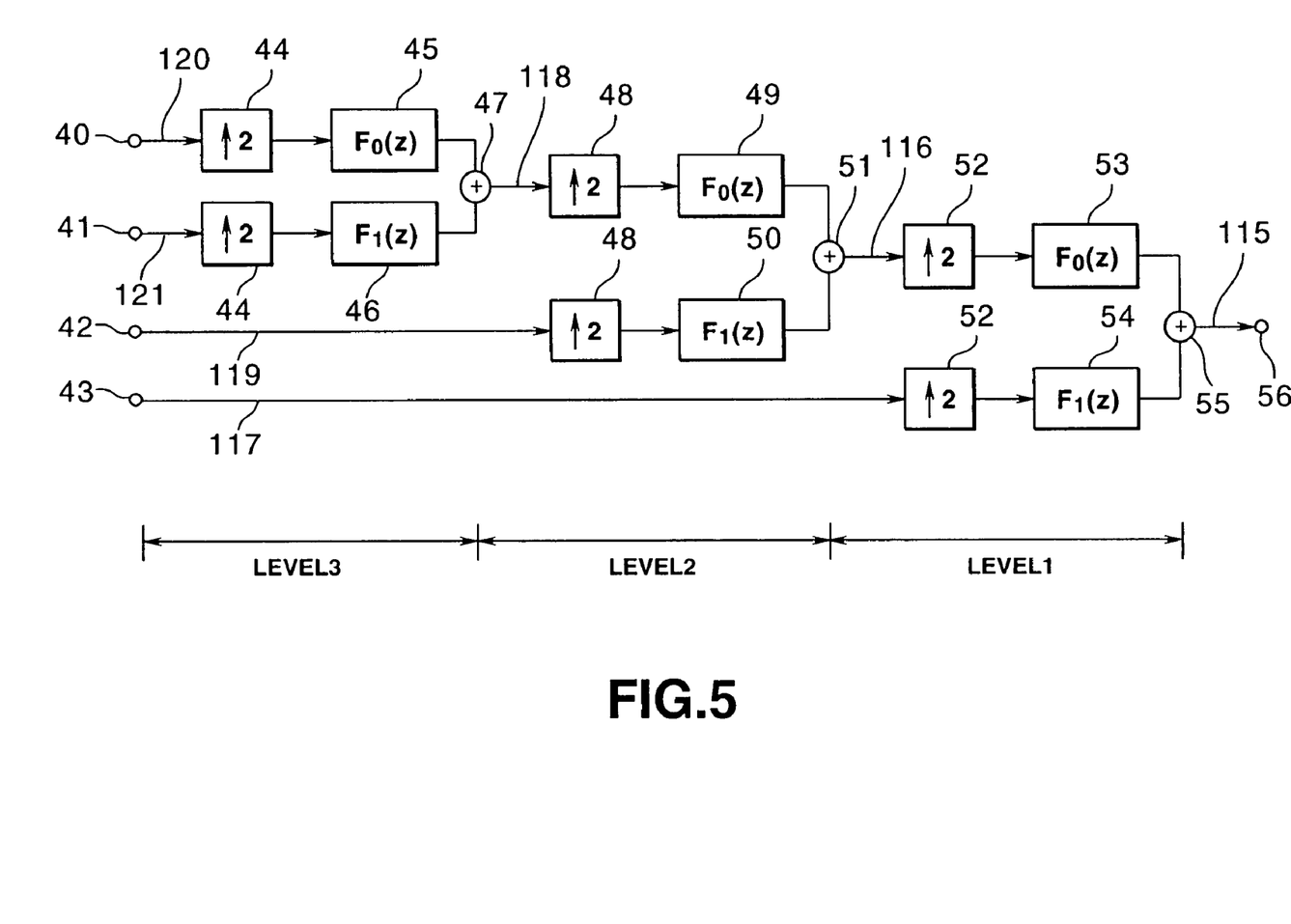
FIG. 5 is a block diagram showing the structure of an ordinary wavelet inverse transform unit.

The structure and the operation of the routine wavelet inverse transform is explained with reference to FIG. 5. When the band components, outputted by the wavelet transform explained in connection with FIG. 3, that is the LLL component 120, LLH component 121, LH component 119 and the H component 117, are inputted at an input terminal 43, the LLL component 120 and the LLH component 121 are first upsampled by a factor of two by upsamplers 44, 44. The low range component and the high range component are filtered in succession by a low-pass filter 49 and a high-pass filter 46, respectively, and synthesized together by an adder 47. This completes the inverse transform of level 3, so that a band component LL118 is obtained. The band component LL118 and the LH component 119 from the input terminal 42 are upsampled to a double resolution by upsamplers 48, 48. The low range component and the high range component are filtered in succession by a low-pass filter 49 and a high-pass filter 50, respectively, and synthesized together by an adder 51. This completes the inverse transform of level 2, so that a band component L116 is obtained. The band component L116 and the H component 117 from the input terminal 43 are upsampled to a double resolution by upsamplers 52, 52. The low range component and the high range component are filtered in succession by a low-pass filter 53 and a high-pass filter 54, respectively, and synthesized together by an adder 55. This completes the level 1 inverse transform so that an ultimate inverse-transformed decoded signal 115 is outputted at an output terminal 56. The above is the basic structure and operation of the routine wavelet inverse transform.

Figure 6:
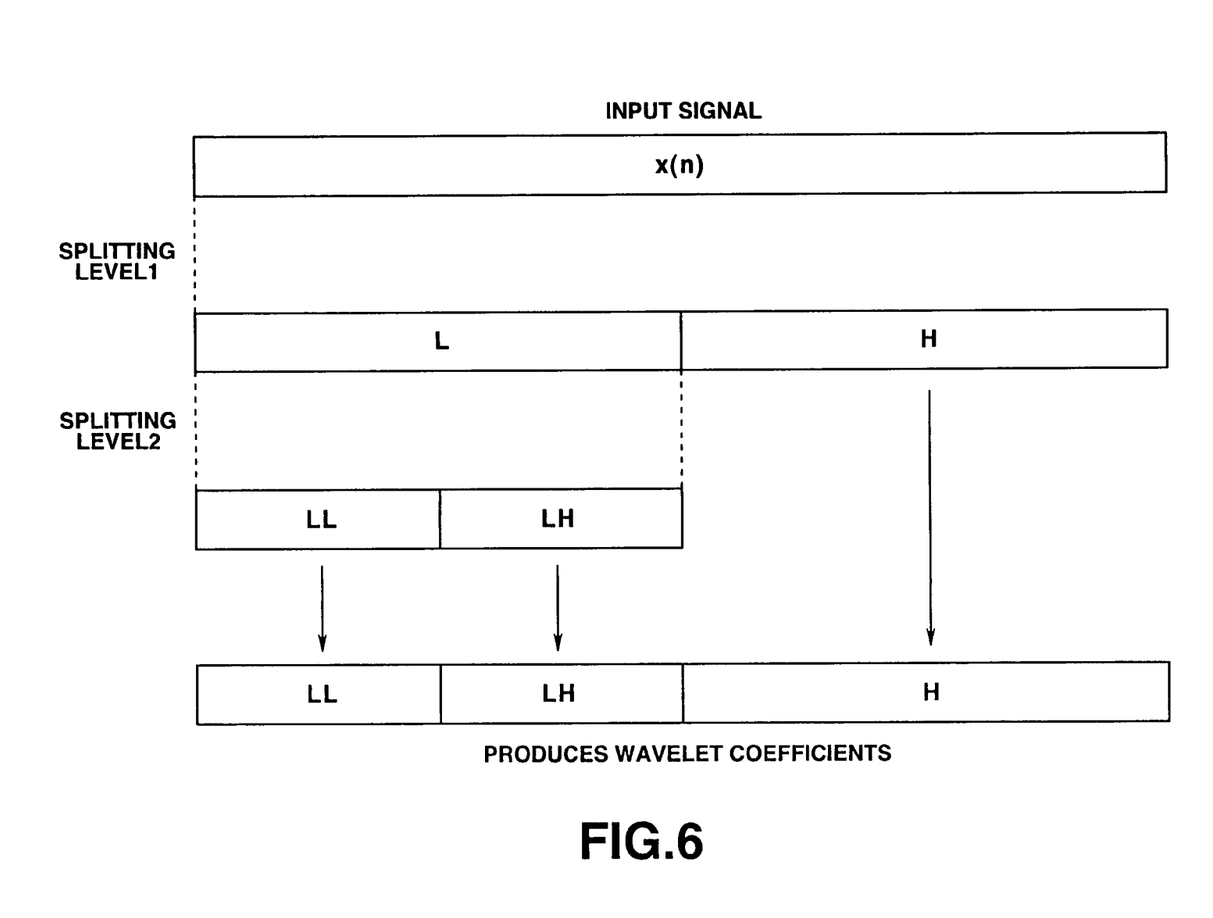
FIG. 6 is a conceptual view showing wavelet coefficients on wavelet splitting up to two.

FIG. 6 represents the wavelet transform in connection the signal length. As a result of level 1 transform of the entire signal input x(n), two sorts of coefficients L and H, having a length equal to one-half that of x(n), are generated. In addition, the level 2 transform splits the low range component L into coefficients LL and LH with one-half lengths.

Figure 7:
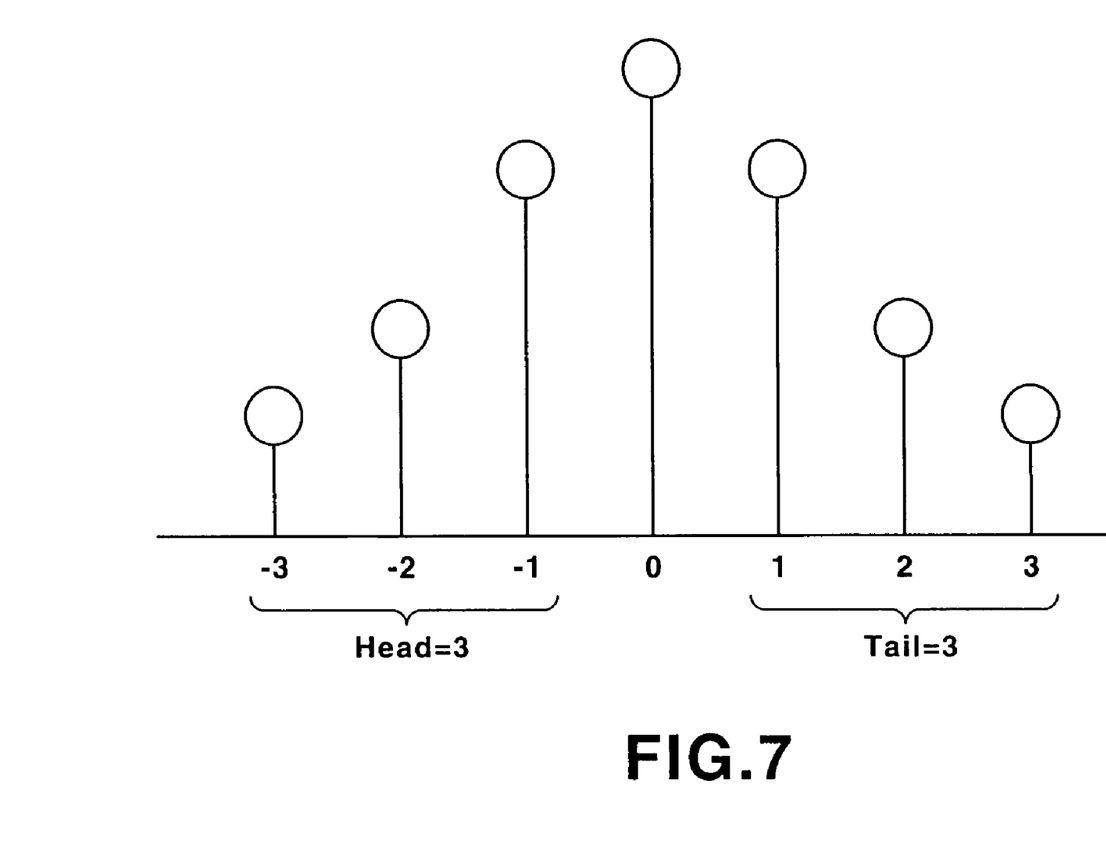
FIG. 7 shows an impulse response of a filter for performing wavelet transform.

In the present embodiment, a linear phase FIR filter is assumed, with the tap length of filters used for wavelet transform and wavelet inverse transform being L, the number of impulse responses during the negative time being Head and with the number of impulse responses during the positive time excluding 0 being Tail. FIG. 7 shows a case wherein L=7, Head=3 and Tail=3. That is, according to the present invention, the transform coefficients on the outer rim of a specified area are associated with the number of impulses of the filter used for wavelet inverse transform.

Figure 8:
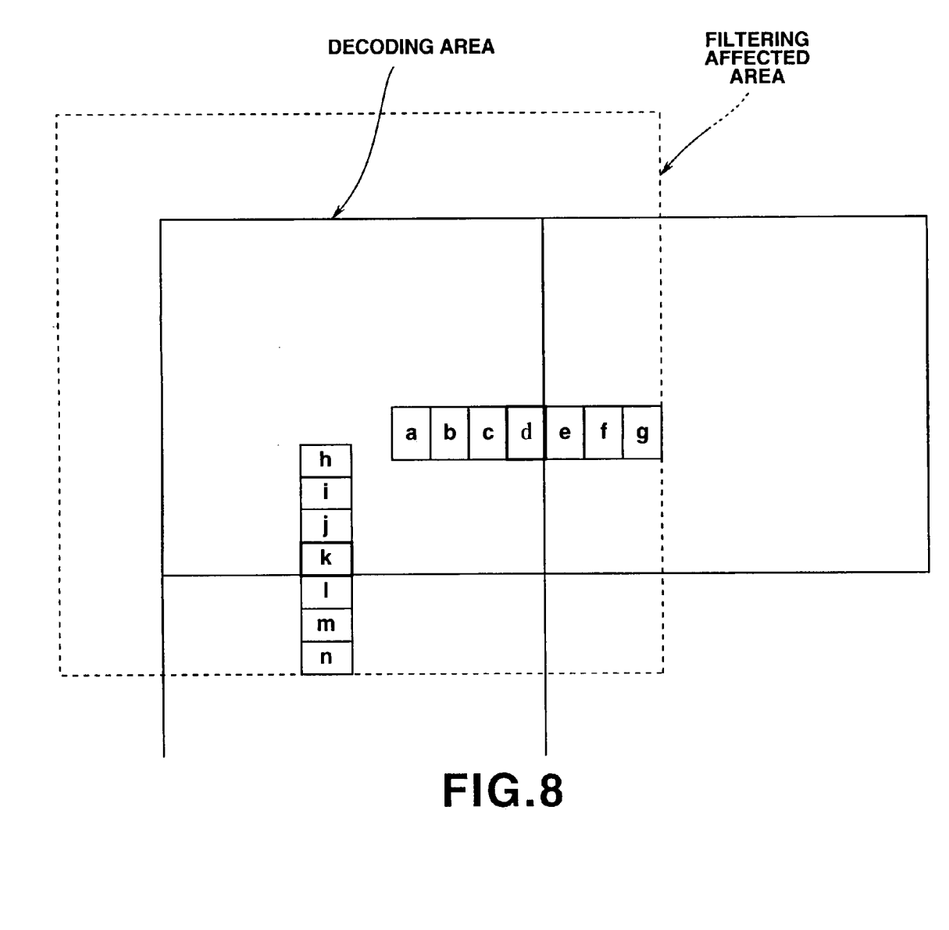
FIG. 8 shows a decoding object range and a filtering range.

The filtering operation at the time of wavelet inverse transform is explained with reference to FIG. 8 showing a case wherein a filter of an odd number tap length L=7 shown in FIG. 7 is used. It may be seen that, in filtering in both the horizontal and vertical directions, three coefficients each on the left and right sides of the current position (d and k) are affected by filtering. Therefore, if the center position of a coefficient lies on the boundary of an area being inverse transformed, as in the case of the coefficients d and k, coefficients needs to be extracted from the neighboring area. In FIG. 8, now explained, the coefficient area to be extracted in redundance are expressed as L_head, L_tail (low range), H_head, H_tail (high range).

Figure 9:
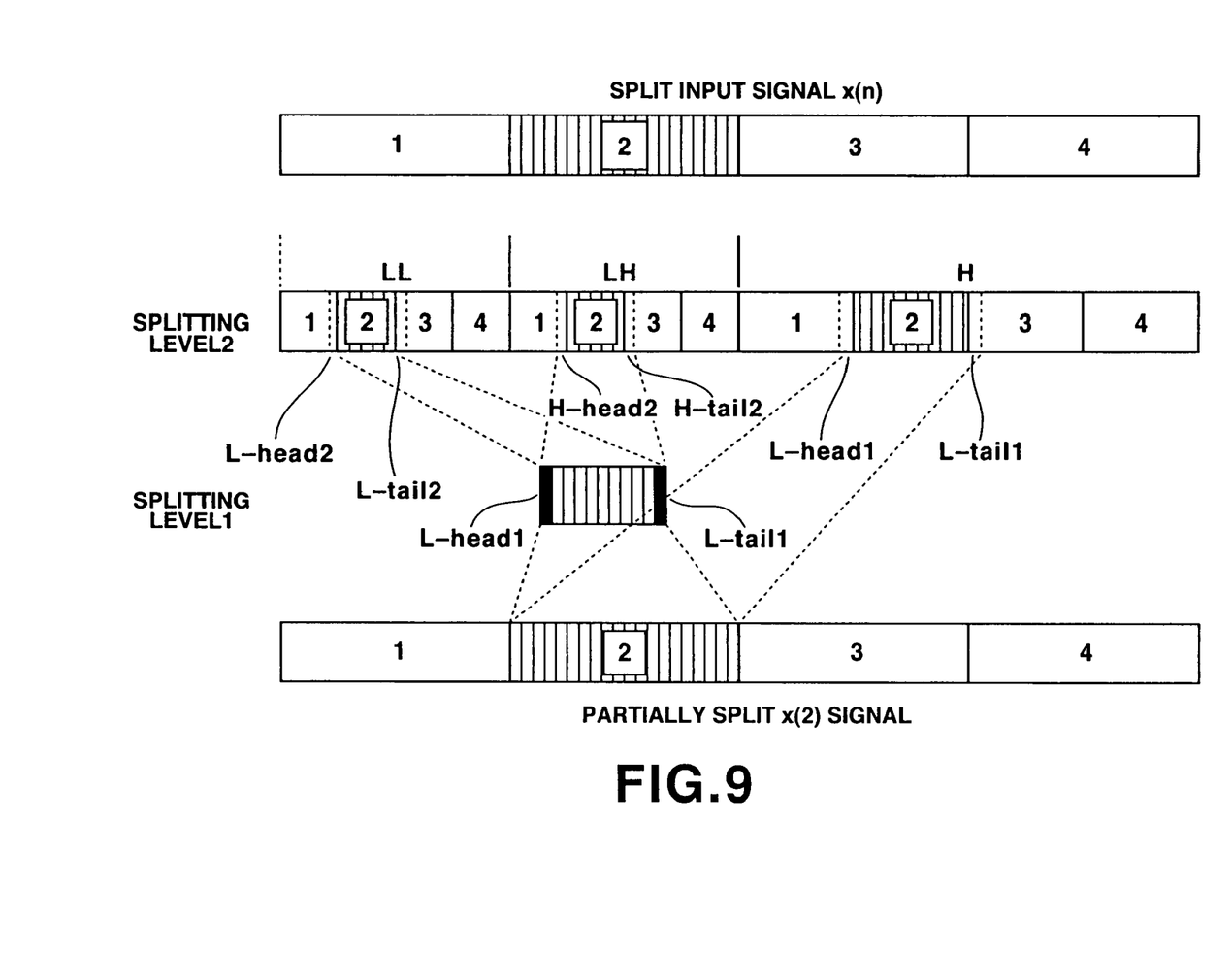
FIG. 9 shows partial decoding of a one-dimensional specified area employing an overlap holding method.

FIG. 9 shows the distribution of band components when the wavelet transform is applied to a one-dimensional signal x(n) up to the level 2. it may be seen that a shaded portion 2 of x(n) is reflected by a portion indicated 2 in each of bands LL, LH and H. Therefore, in order to calculate the wavelet transform coefficients of the level 1 from the level 2, the wavelet inverse transform means is in need of P2 partial coefficients corresponding to the area 2, among the band components of the splitting level 2, partial coefficients in LL, along with L_head 2 and L_tail 2, lying forwardly and backwardly thereof, and partial coefficients in LH, along with H_head 2 and H_tail 2, lying forwardly and backwardly thereof. 17.

Then, of the coefficients of the splitting level 1, obtained on inverse transform, as described above, only (L_head 1+2P2+L_tail) transform coefficients, necessary by the overlap holding processing as later explained, are extracted. Then, P1 partial coefficients, lying in a portion 2 in the band H, are extracted, along with the coefficients L_head and L_tail, lying ahead and at back of the P1 coefficients, are extracted. Then, from decoded signals, obtained on inverse transform of extracted coefficients obtained on inverse transform of the level 2 LL and LH, and from the partial coefficients from H, the partial signals x(2), corresponding to the target area 2, are taken out using overlap holding processing. The above is the explanation on the operation for the one-dimensional system.

The overlap holding processing is introduced in, for example, Nishiro Takaya, co-inventor of the present case, an assistant professor of Tokyo Metropolitan University, "Fast Fourier Transform and its Application", published by SHOKODO, pp. 109 to 112. This technique is a method of linear convolution of an infinite input sequence and features employing overlapping data in dividing input data into blocks and also employing cyclic convolution as the block-based convolution. In the cyclic convolution, initial overlapping portions of the cyclic convolution are truncated. There is no necessity of summing the results of the cyclic convolution.

Figure 10:
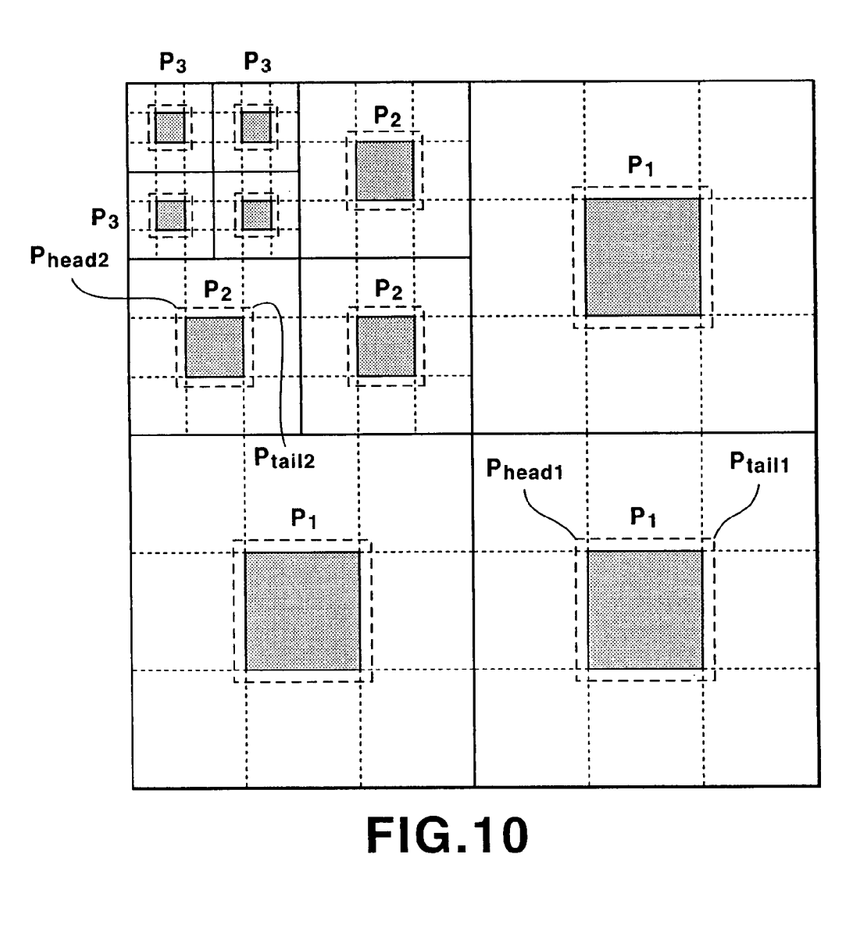
FIG. 10 shows partial decoding of a two-dimensional specified area employing an overlap holding method.

The two-dimensional wavelet inverse transform is now explained with reference to FIG. 10, showing areas of wavelet transform coefficients, required from one splitting level to another, when the shaded portion in FIG. 2 is to be decoded, such areas being shown shaded in FIG. 10.

For completely decoding the target partial picture, it is necessary to extract and inverse-transform surrounding coefficients, shown by broken lines in FIG. 10, as discussed above. Since FIG. 10 shows a case wherein the dividing level is three, the inverse transform is performed using partial coefficients of the extracted four areas in performing the level 3 decoding. From the next level on, decoding is performed using the three partial coefficients of the level in question and the completely decoded results of the previous level. This sequence of operations is repeated to realize the partial decoding.

In FIG. 10, Pheadi and Ptaili denote the number of coefficients required to be added on the left and upper sides at level i and that required to be added on the right and lower sides at level i, respectively. These coefficients are extracted from the outer rim side of the object area, as discussed above. In the two-dimensional system, only valid coefficients at each inverse transform level are selected and extracted by the overlap holding processing. The foregoing is the explanation on the partial decoding of a two-dimensional picture.

A wavelet decoding device 60, as a specified example of the wavelet decoding device of the present invention, operating by the wavelet decoding method of the present invention, is now explained with reference to FIG. 11. This wavelet decoding device 60 represents a specified example of the wavelet inverse transform device 10 built into a decoding device.

This wavelet decoding device 60 includes an entropy decoding unit 62, a dequantizer 63, a transform coefficient back-scanning unit 64 and the above-mentioned wavelet inverse transform device 10.

The entropy decoding unit 62 entropy-decodes an encoded bitstream generated on wavelet transform encoding a picture.

When the wavelet transform coefficients are being quantized in the wavelet transform encoding, the dequantizer 63 dequantizes the quantization coefficients obtained at the entropy decoding unit 62 to restore the dequantized quantization coefficients to 26.

If the transform coefficients are being scanned to raise the encoding efficiency in the wavelet transform encoding, the transform coefficient back-scanning unit 64 back-scans the transform coefficients to restore the original coefficients. It is wavelet transform coefficients 107 from this transform coefficient back-scanning unit 64 that are routed to the decoding object coefficient extraction unit 12 of the wavelet inverse transform device 10.

Figure 11:
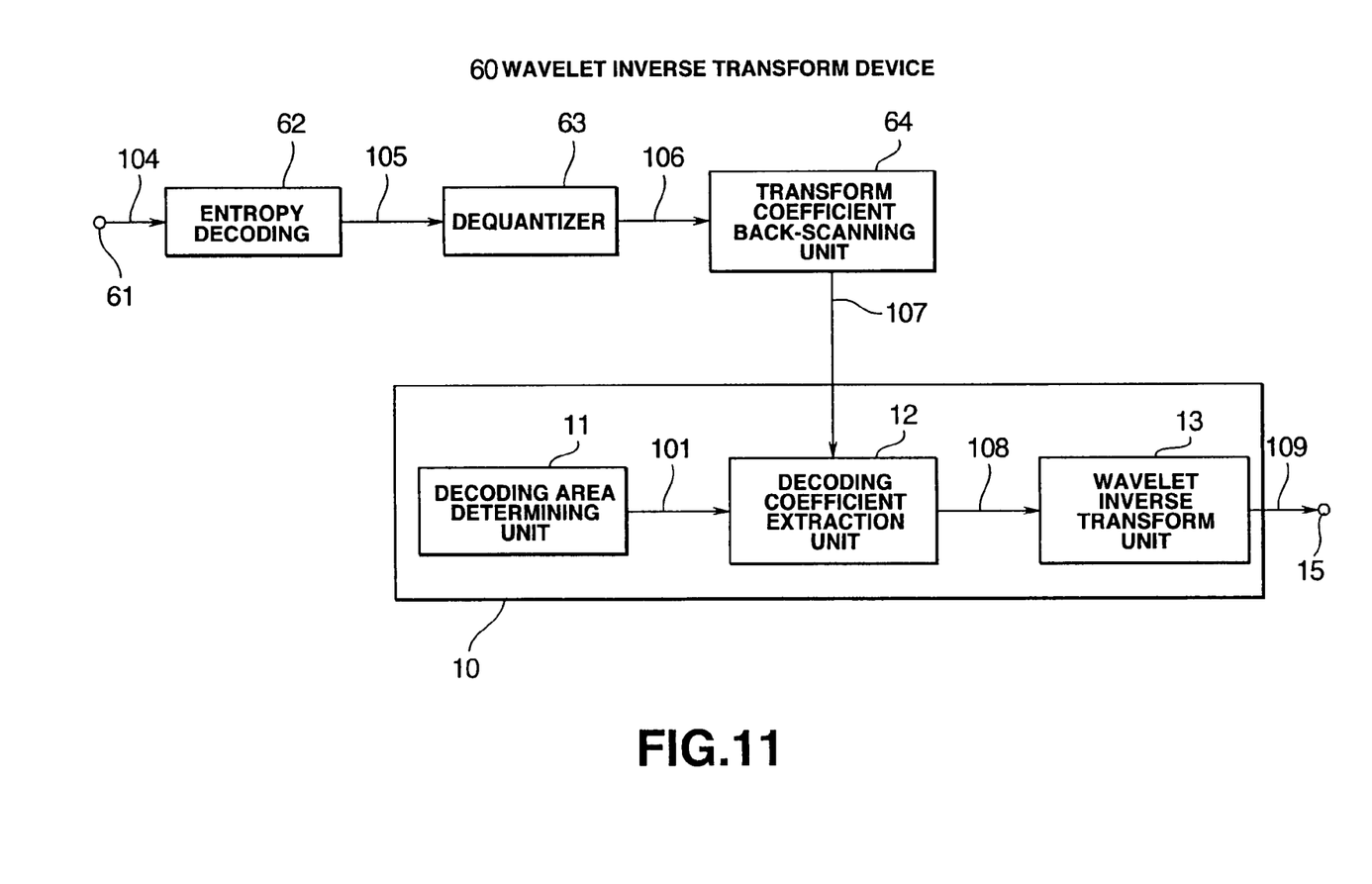
FIG. 11 shows a specified example of a wavelet decoding device according to the present invention and is a block diagram of a wavelet decoding device operating based on the wavelet decoding method of the present invention.
Figure 12:
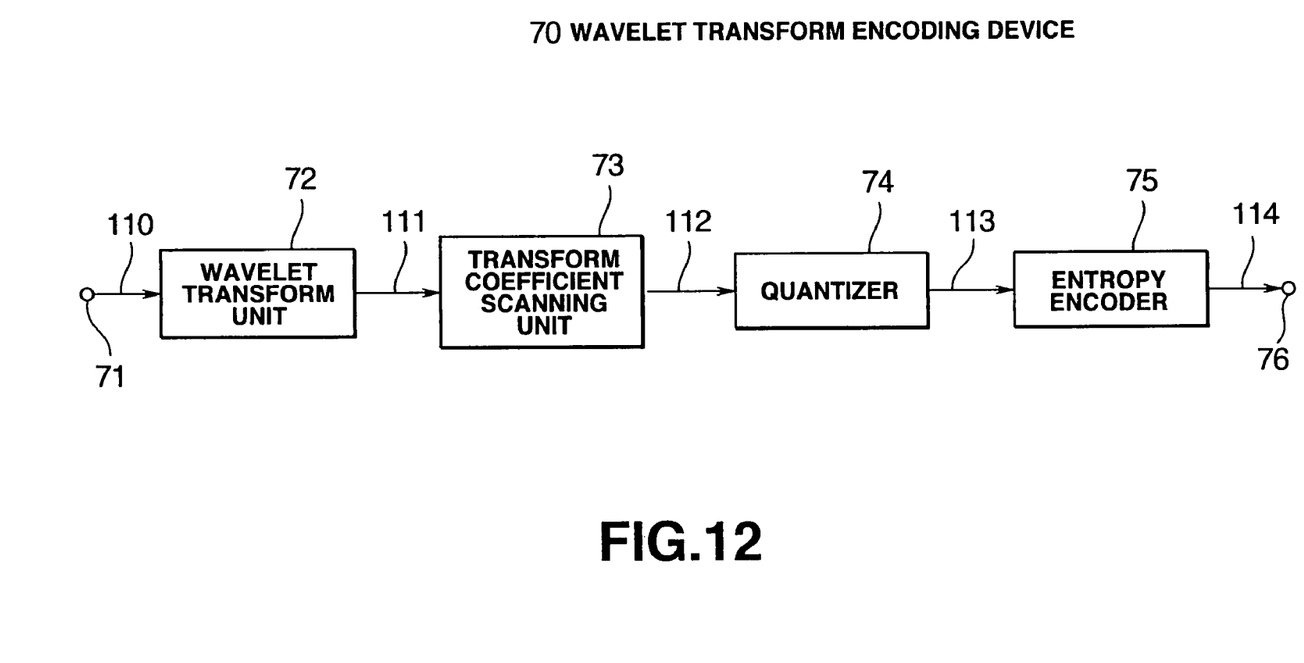
FIG. 12 is a block diagram showing the structure of a wavelet transform encoding device.

Before proceeding to description of the wavelet decoding device 60, reference is had to FIG. 12 to explain an associated wavelet transform encoding device 70.

The wavelet transform encoding device 70 is made up of a wavelet transform unit 72, a transform coefficient scanning unit 73, a quantizer 74 and an entropy encoding unit 75.

First, a picture photographed by a camera, not shown, is digitized and input picture signals 110 are retrieved at an input terminal 71. The wavelet transform unit 72 generates transform coefficients 111 from the input picture signals 110 to send the generated transform coefficients 111 to the transform coefficient scanning unit 73, which then scans the transform coefficients to re-array the coefficients such as to improve the encoding efficiency. For example, it is assumed here that the wavelet transform coefficients are scanned from left to right (in the horizontal direction) and from above to below (in the vertical direction). The as-scanned coefficients 112, obtained on re-arraying in the transform coefficient scanning unit 73, are quantized by the quantizer 74 from which quantized coefficients 113 are outputted to the entropy encoding unit 75.

It suffices for the quantizer 74 to employ routinely used scalar quantization as indicated by the following equation:

$$Q = x/\Delta \qquad (1)$$

where x is a value of the wavelet transform coefficient and $\Delta$ is a quantization index value.

The entropy encoding unit 75 applies information source encoding to the quantized coefficients 113 by way of information compression. As the information source encoding at this entropy encoding unit 75, the Huffman encoding or the arithmetic encoding may be used. An ultimate encoded bitstream 114 is sent out via the entropy encoding unit 75 to an output terminal 76.

The operation of the wavelet decoding device 60 is hereinafter explained. An encoded bitstream 104 is sent via an input terminal 61 to the entropy decoding unit 62, which then entropy-decodes the encoded bitstream 104 to send the resulting quantized coefficients 105 to the dequantizer 63.

The dequantizer 63 dequantizes the quantized coefficients 105 to output the dequantized transform coefficients. Meanwhile, the entropy decoding unit 62 needs to be a counterpart device of the entropy encoding unit 75.

It suffices for the dequantizer 63 to employ routinely used scalar dequantization as indicated by the following equation:

$$x = Qx/\Delta \qquad (2)$$

where Q is a value of the quantization coefficient and A is a quantization index value.

The transform coefficients 106 are sent to the transform coefficient back-scanning unit 64 which then applies back-scanning transform, as a reverse procedure to the operation performed by the transform coefficient scanning unit 73, to the transform coefficients 106 to generate the original transform coefficients. The resulting transform coefficients 107 are inputted to the decoding object coefficient extraction unit 12 of the wavelet inverse transform device 10. The ensuing operation is the same as that described above and hence is not explained for simplicity.

In the wavelet decoding device 60, shown in FIG. 11, it is possible to decode only a desired portion of a picture, without it being necessary to input an encoded bitstream produced on wavelet transform of an entire picture to decode the entire picture, as is done in the conventional practice. Of course, there is imposed no constraint on the encoding device 70 to split the picture into plural areas at the outset to performing the encoding.

The fact that only an optional portion needs to be decoded gives three favorable results, that is the results that the processing volume of convolution in filtering may be reduced, the memory width may also be reduced and that the memory accessing frequency can be diminished.

There is also such merit that, by exploiting overlap holding processing, the operation on the encoder side may be the reverse of that on the decoder side and vice versa so that the teaching of the present invention can be applied to lossless encoding.

Moreover, since it suffices to read out transform coefficients of an decoding object, there is no necessity of limiting the partial area of the decoding object to a rectangular area such that an area of a circle or a more complex figure can be dealt with.

Although the configuration of the present invention has been stated to be implemented by hardware, it may, of course, be implemented by software.

What is claimed is:

1. A wavelet inverse transform device comprising:
    decoding object coefficient extracting means for extracting, from a plurality of wavelet transform coefficients, partial coefficients necessary for decoding a specified area of a picture; and
    wavelet inverse transform means for inverse transforming said extracted partial coefficients,
    wherein said extracted partial coefficients are wavelet transform coefficients that include said specified area of every hierarchically band split band components and outside said specified area,
    said wavelet inverse transform transforms using three partial coefficients of the level and the completely transformed results of the previous level when a level other than a first level are transformed.

2. The wavelet inverse transform device according to claim 1 further comprising:
    decoding object are determining means for determining a decoding object area, said decoding object coefficient extracting means extracting coefficients necessary for decoding an area determined by said decoding object area determining means.

3. The wavelet inverse transform device according to claim 1 wherein said wavelet transform coefficients are made up of transform coefficients of a plurality of splitting levels and include transform coefficients inside of and on an outer rim side of each splitting level based specified area.

4. The wavelet inverse transform device according to claim 1 wherein transform coefficients on the outer rim side of the specified area extracted by said decoding object coefficient extracting means correspond to the number of impulse response of a filter used in said wavelet inverse transform means.

5. The wavelet inverse transform device according to claim 3 wherein said wavelet transform coefficients are obtained on hierarchically splitting a low range component of a plurality of splitting levels.

6. The wavelet inverse transform device according to claim 1 wherein, of transform coefficients generated by said wavelet inverse transform means, those in a valid range based on overlap holding processing are extracted.

7. The wavelet inverse transform device according to claim 6 wherein extraction of the coefficients in the valid range based on said overlap holding processing is performed from one level of the wavelet splitting to another.

8. A wavelet inverse transform method comprising the steps of:
    extracting, from a plurality of wavelet transform coefficients, partial coefficients necessary for decoding a specified area of a picture; and
    transforming said extracted partial coefficients of said specified area;
    wherein said extracted partial coefficients are wavelet transform coefficients that include said specified area of every hierarchically band split band components and outside said specified areas,
    said wavelet inverse transform transforms using three partial coefficients of the level and the completely transformed results of the previous level when a level other than a first level are transformed.

9. A wavelet decoding device comprising:
    entropy decoding means for entropy decoding an encoded bitstream, generated on wavelet inverse transforming a picture;
    decoding object coefficient extracting means for extracting, from a plurality of wavelet transform coefficients obtained by said entropy decoding means, partial coefficients necessary for decoding a specified area of said picture; and
    wavelet inverse transform means for inverse transforming said extracted partial coefficients of said specified area,
    wherein said extracted partial coefficients are wavelet transform coefficients that include said specified area of every hierarchically band split band components and outside said specified area,
    said wavelet inverse transform transforms using three partial coefficients of the level and the completely transformed results of the previous level when a level other than a first level are transformed.

10. The wavelet decoding device according to claim 9 further comprising:
    dequantizing means to restore wavelet transform coefficients obtained by said entropy decoding means to restore wavelet transform coefficients, said decoding object coefficient extracting means extracting coefficients necessary for decoding the specified area from among the wavelet transform coefficients obtained by said dequantizing means.

11. The wavelet decoding device according to claim 9 wherein
    decoding object area determining means for determining a decoding object area, said decoding object coefficient extracting means extracting coefficients necessary for decoding an area determined by said decoding object area determining means.

12. The wavelet decoding device according to claim 9 wherein
    said wavelet transform coefficients are made up of transform coefficients of a plurality of splitting levels and include transform coefficients inside of and on an outer rim side of each splitting level based specified area.

13. The wavelet decoding device according to claim 9 wherein
    transform coefficients on the outer rim side of the specified area extracted by said decoding object coefficient extracting means correspond to the number of impulse response of a filter used in said wavelet inverse transform means.

14. The wavelet inverse transform device according to claim 12 wherein said wavelet transform coefficients are obtained on hierarchically splitting a low range component of a plurality of splitting levels.

15. The wavelet inverse transform device according to claim 9 wherein, of transform coefficients generated by said wavelet inverse transform means, those in a valid range based on overlap holding processing are extracted.

16. The wavelet inverse transform device according to claim 15 wherein extraction of the coefficients in the valid range based on said overlap holding processing is performed from one level of the wavelet splitting to another.

17. A wavelet decoding method comprising the steps of:
    entropy decoding an encoded bitstream, generated on wavelet inverse transforming a picture;

extracting, from a plurality of wavelet transform coefficients obtained by said entropy decoding means, partial coefficients necessary for decoding a specified area of said picture; and inverse transforming said extracted partial coefficients of said specified area;

wherein said extracted partial coefficients are wavelet transform coefficients that include said specified area of every hierarchically band split band components and outside said specified area, said wavelet inverse transform transforms using three partial coefficients of the level and the completely transformed results of the previous level when a level other than a first level are transformed.

18. The wavelet decoding method according to claim 17 further comprising:

a dequantizing step of dequantizing the quantized coefficients obtained by said entropy decoding step, said decoding object coefficient extracting step extracting coefficients necessary for decoding the specified area from among the wavelet transform coefficients obtained by said dequantizing step.

19. The wavelet inverse transform device according to claim 8, wherein extracting steps extract transform coefficients outside said specified area that are necessary for decoding at least one of said transform coefficients inside said specified area.

20. The wavelet inverse transform device according to claim 17, wherein extracting steps extract transform coefficients outside said specified area that are necessary for decoding at least one of said transform coefficients inside said specified area.

* * * * *